United States Patent [19]

Asano

[11] Patent Number: 5,804,007
[45] Date of Patent: Sep. 8, 1998

[54] METHODS OF MANUFACTURING COMPOSITE FIBER SHEET

[75] Inventor: Tadao Asano, Hashima-gun, Japan

[73] Assignee: Sunchemical Co., Ltd., Gifu, Japan

[21] Appl. No.: 871,299

[22] Filed: Jun. 9, 1997

[51] Int. Cl.[6] .................................................. B32B 31/08
[52] U.S. Cl. .............................. 156/72; 156/148; 428/85; 19/302
[58] Field of Search ........................ 156/72, 148; 428/85, 428/95; 19/301, 302; 66/9 B

[56] References Cited

U.S. PATENT DOCUMENTS 3,822,173   7/1974   Graber et al. .
4,416,936  11/1983   Erickson et al. .
4,521,472   6/1985   Gold .

*Primary Examiner*—Steven D. Maki
*Assistant Examiner*—Sam Chuan Yao
*Attorney, Agent, or Firm*—Donald S. Dowden; Cooper & Dunham LLP

[57] ABSTRACT

A method of manufacturing a composite fiber sheet comprising: forming the first pile layer on the surface of the first fiber sheet by needling; laminating the second fiber sheet on the back-side of the first fiber sheet; and forming the second pile layer on the surface of the first fiber sheet by needling. The composite fiber sheet so obtained has an excellent feeling, an attractive appearance and a variety functionality.

3 Claims, 5 Drawing Sheets

METHODS OF MANUFACTURING COMPOSITE FIBER SHEET

BACKGROUND OF THE INVENTION

1. Field of the Invention

The present invention relates to methods of manufacturing a composite fiber sheet which has an excellent feeling, an attractive appearance and a variety of functions.

2. Description of the Prior Art

A composite fiber sheet which has a pile layer on its surface is useful as a floor sheet and the like. A conventional composite fiber sheet has been manufactured by a method comprising; laminating a pair of fiber sheets 12, 13 reciprocally as shown in FIG. 10 and needling from the backside of the lower fiber sheet 13 as indicated by the arrow in FIG. 10 to form a pile layer 13A on the surface of the upper fiber sheet 12, or a method comprising; forming a pile layer on a surface of a upper fiber sheet by needling from its back-side and backing the upper fiber sheet with a lower fiber sheet.

For the step of needling to form the pile layer, a needling machine which provides a lot of pile forming needles is used. However since the density of the pile forming needles is limited depending on the space in the needling machine, the pile density of the pile layer of the product is limited accordingly, as a result the piles in the pile layer are apt to lie down, so that the product which has an excellent bulky feeling is difficult to be obtained.

Furthermore, to give an attractive appearance, in the conventional composite fiber sheet the color of the pile layer 13A is set to be different from the color of the fiber sheet 12 under the pile layer 13A to form a pile layer 13A having a different color from the fiber sheet 12 which is under the pile layer 13A. But there is a problem that the above described conventional composite fiber sheet has a monotonous appearance because the pile layer 13A has a single color.

SUMMARY OF THE INVENTION

Accordingly, an object of the present invention is to increase the pile density of the pile layer of the fiber sheet to give an excellent bulky feeling and an attractive appearance to the fiber sheet.

Further another object of the present invention is to give an attractive appearance to the fiber sheet by setting the color of the pile layer different from the color of the fiber sheet under the pile layer.

According to the present invention to attain these objects there is provided a method of manufacturing a composite fiber sheet comprising:

forming the first pile layer on the surface of the first fiber sheet by first needling from the back-side of the first fiber sheet;

laminating the second fiber sheet on the back-side of the first fiber sheet; and forming the second pile layer on the surface of the first fiber sheet by second needling from the back-side of the composite fiber sheet and combining the first fiber sheet and the second fiber sheet.

In the above described method it is desirable to set the locations of piles of said first pile layer formed by said first needling to be different from the locations of piles of said second pile layer formed by said second needling.

BRIEF DESCRIPTION OF THE DRAWINGS

FIG. 1 is a schematic side view showing a step of double needling to form pile layers;

FIG. 2 is a partially sectional view of the first fiber sheet after first needling to form the first pile layer;

FIG. 3 is a partially sectional view of a composite fiber sheet;

FIG. 4-A is a schematic plan view showing the condition of a sheet after first needling to form the first pile layer;

FIG. 4-B is a schematic plan view showing the condition of a sheet after second needling to form the second pile layer;

FIG. 5 is a schematic side view showing the condition of a sheet before second needling of the second fiber sheet;

FIG. 6 is a partially sectional view of a composite fiber sheet;

FIG. 7 is a partially perspective view of a composite fiber sheet;

FIG. 8 is a schematic side view showing a step of double needling to form pile layers;

FIG. 9 is a partially sectional view of a composite fiber sheet;

DETAILED DESCRIPTION OF THE INVENTION

The fiber sheet of the present invention is a web or a needle punched nonwoven fabric consisting of synthetic fiber such as polyester fiber, polyethylene fiber, polypropylene fiber, polyamide fiber, acryl fiber, urethane fiber, poly vinyl chloride fiber, poly vinylidene chloride fiber, acetate fiber and the like; natural fiber such as pulp, cotton, wool, coconut fiber, hemp fiber, bamboo fiber and the like; inorganic fiber such as glass fiber, carbon fiber, ceramic fiber and the like; or regenerated fiber. A mixture of two or more kinds of said fiber may also be used in the present invention.

If desirable, the color of the first fiber sheet is set to be different from the color of the second fiber sheet. Further if desirable, high grade fiber such as polyamide fiber, acryl fiber and the like may be used for the first fiber sheet, and low grade fiber such as polypropylene fiber, polyester fiber, regenerated fiber and the like may be used for the second fiber sheet. For the second fiber sheet, if desirable, thermoplastic fiber such as polyethylene fiber, polypropylene fiber, polyester fiber having a low melting point and the like may be used to give moldability. If desirable, the first fiber sheet and/or the second fiber sheet may be subjected to flame-retardant treating, antifungal treating and the like to give functionality.

Furthermore if desirable, the pile density may be set to be different between the first pile layer and the second pile layer.

In the composite fiber sheet of the present invention, the density of the piles can be increased by setting the piles of the second pile layer of the second fiber sheet between the the piles of the first pile layer of the first fiber sheet. If desirable, the color, shape and the like may also be set to be different between the first pile layer of the first fiber sheet and the second pile layer of the second fiber sheet. Furthermore, multiplicity can be given to the composite fiber sheet by using different material between the first fiber sheet and the second fiber sheet, changing the pile density, the height of the piles and the like between the first pile layer and the second pile layer, and/or inserting other kinds of sheets.

Figure 1:
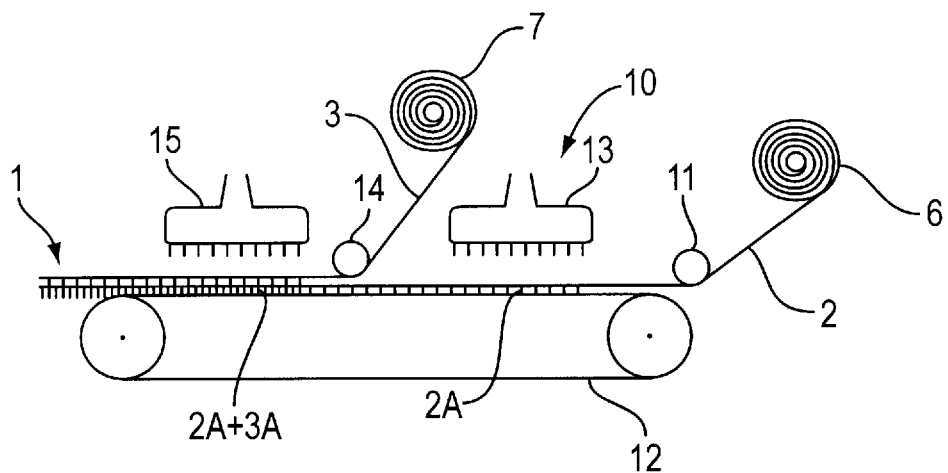
FIG. 1 to FIG. 4 relate to an embodiment of the present invention.
Figure 2:
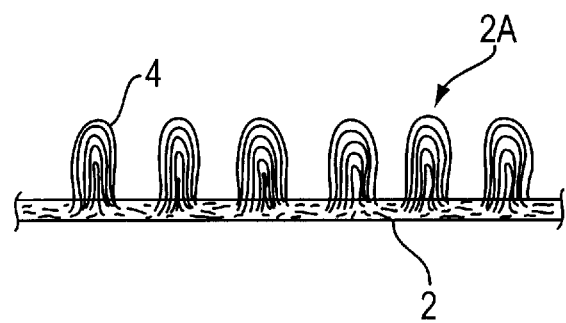
Figure 3:
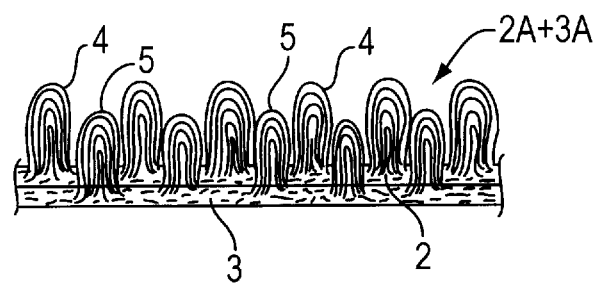
Figure 4A:
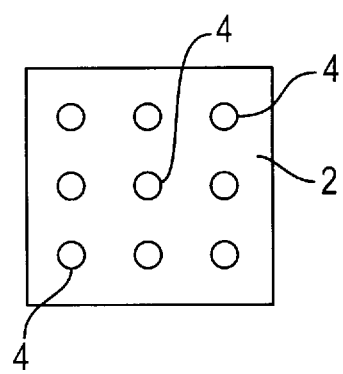
Figure 4B:
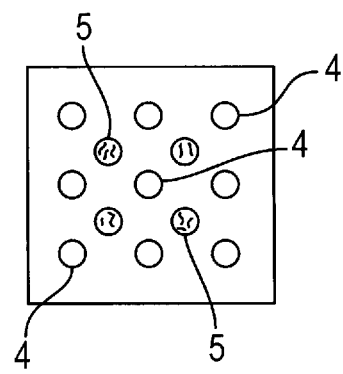

FIG. 1 to FIG. 4 relate to an embodiment of the present invention. Referring to FIG. 1 to FIG. 4, the first fiber sheet 2 consists of a needle punched nonwoven fabric. The first fiber sheet 2 is drawn out from the roll 6, supplied on the conveyer 12 of the double piling machine 10 through the guide roller 11. As shown in FIG. 2 and FIG. 4-A, the first pile layer 2A which consists of a large number of piles 4 is formed on the surface of the first fiber sheet 2 by needling from the back-side of the sheet 2 using the first needling machine 13.

Then the second fiber sheet 3 which has a different color from the color of the first fiber sheet 2 drawn out from the roll 7 is laminated on back-side of the sheet 2 through the guide roller 14. The second fiber sheet 3 also consists of a needle punched nonwoven fabric. Then the second pile layer 3A which consists of a large number of piles 5 is formed on the surface of the first fiber sheet 2 and at the same time the first fiber sheet 2 and the second fiber sheet 3 are combined together by needling from the back-side of the sheet 3 using the second needling machine 15.

As shown in FIG. 3 and FIG. 4-B, the composite fiber sheet 1 is manufactured so that each pile 5 of the pile layer 3A by the second needling is located between the the piles 4 of the pile layer 2A of the first fiber sheet 2 according to the above procedure. Since the piles 4 of the first pile layer 2A consists of fibers of the first fiber sheet 2, and the piles 5 of the second pile layer 3A mainly consists of fibers of the second fiber sheet 3 to which the fibers of the first fiber sheet 2 are mixed and as a result, the color of the piles 4 becomes different from the color of the piles 5 and the piles 4 and the piles 5 form a spot pattern on the surface of said composite fiber sheet. In this embodiment, the height of the pile 5 is lower than the pile 4 and each pile 4 is supported with the piles 5, so that the piles 4 are prevented from lying down and as a result an excellent bulky feeling is obtained.

For example when polyester fiber or polyamide fiber having a high melting point such as higher than 200° C. is used for the first fiber sheet 2 and polyester fiber or polypropylene fiber having a low melting point such as lower than 200° C. is used for the second fiber sheet 3 and heat treatment is effected on the fiber sheet after the second piling, the root of the piles 4 and 5 are reinforced with the melted second fiber sheet 3, the wear resistance of the product is much improved and further the product can be molded by heating.

Furthermore, when high grade polyamide fiber is used for the first fiber sheet 2 and low grade non-colored polyester fiber or regenerated fiber is used for the second fiber sheet 3 in the composite fiber sheet 1, the pile 4 is conspicuous on the surface of the product because the pile 4 consisting of the fibers of the first fiber sheet 2 is higher than the pile 5 mainly which consisting of fibers of the second fiber sheet 3. As a result the raw material cost can be reduced keeping a luxurious appearance.

Furthermore, the treating cost can be reduced by treating only the first fiber sheet 2 placed on the surface of the composite fiber sheet 1 with flame-retardant or by treating only the second fiber sheet 3 placed on the back-side of the composite fiber sheet 1 with the antifungal agent.

Figure 5:
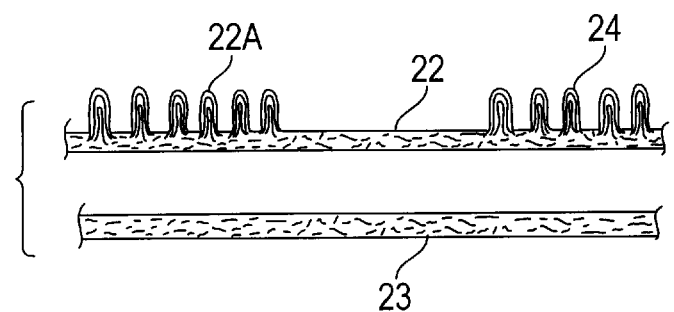
FIG. 5 to FIG. 7 relate to another embodiment of the present invention.
Figure 6:
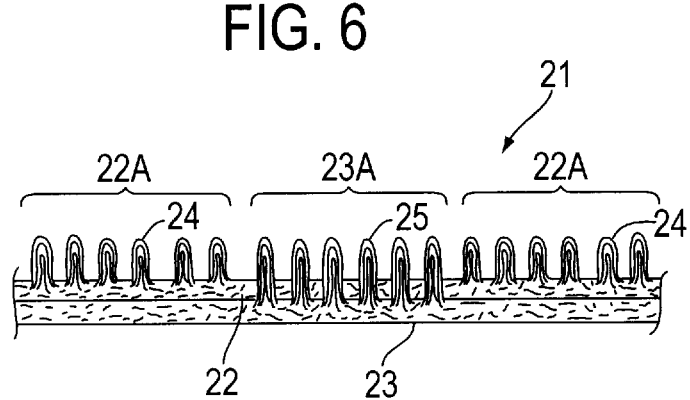
Figure 7:
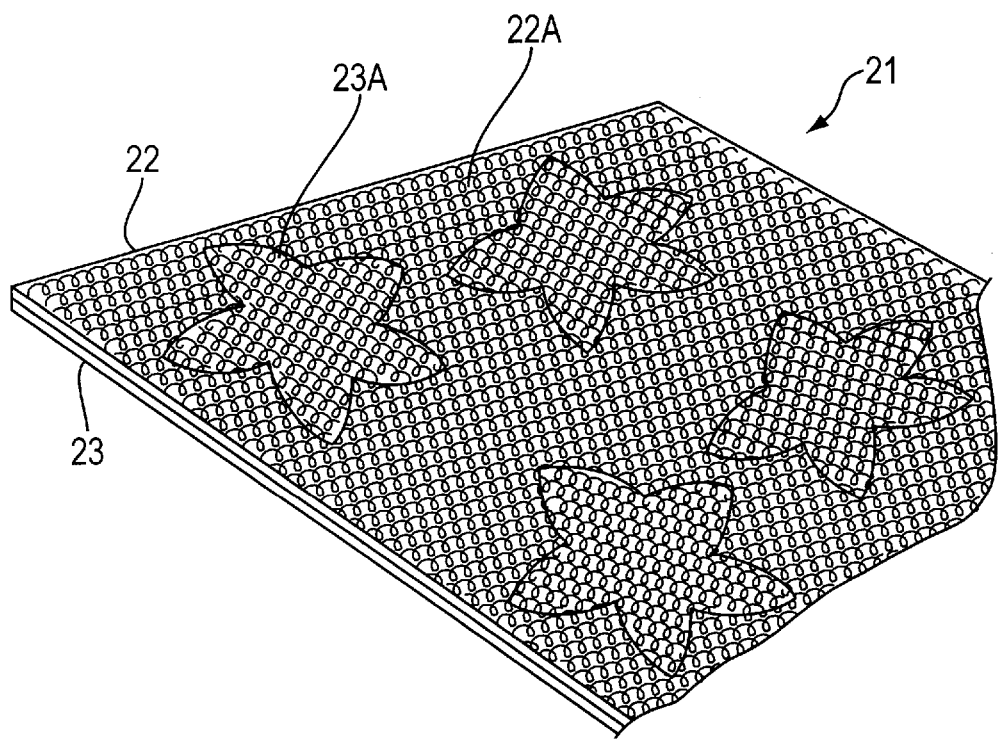

FIG. 5 to FIG. 7 relate to another embodiment of the present invention. In this embodiment the same double piling machine 10 shown in FIG. 1 is also used. Referring to FIG. 5, in this embodiment, the first pile layer 22A consisting of the piles 24 is formed by needling from the back-side of the first fiber sheet 22 consisting of a needle punched nonwoven fabric using the first needling machine 13 excepting the predetermined parts (flower pattern) of the sheet 22. Then the second fiber sheet 23 consisting of a web having a different color from the color of the first fiber sheet 22 is laminated on the back-side of the sheet 22, then as shown in FIG. 6, by needling the predetermined parts (flower pattern) from the back-side of the second fiber sheet 23 using the second needling machine 13 excepting the parts where the first pile layer 22A of the first fiber sheet 22 is formed, the second pile layer 23A consisting of the piles 25 having a different color from the color of the first pile layer 22A is formed and the first fiber sheet 22 and at the same time the second fiber sheet 23 are combined to the first fiber sheet.

According to the above procedure the composite fiber sheet 21 is manufactured wherein the second pile layers 23A having a different color from the color of the first pile layer 22A are partially formed in the first pile layer 22A of the first fiber sheet 22 as a base, as shown in FIG. 7.

Figure 8:
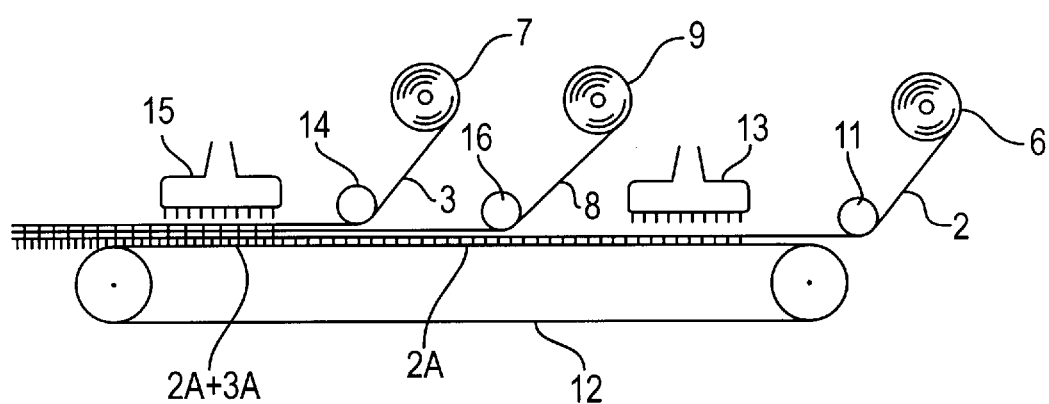
FIG. 8 and FIG. 9 relate to still another embodiment of the present invention.
Figure 9:
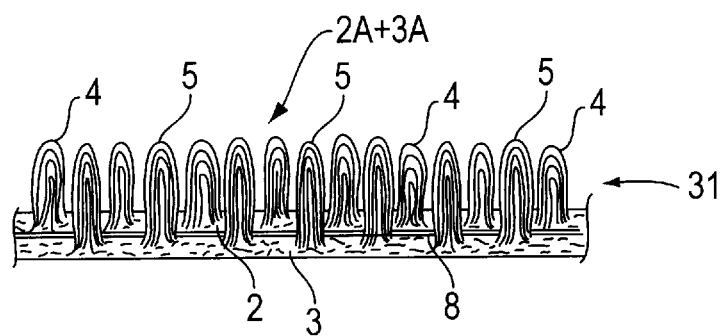
Figure 10:
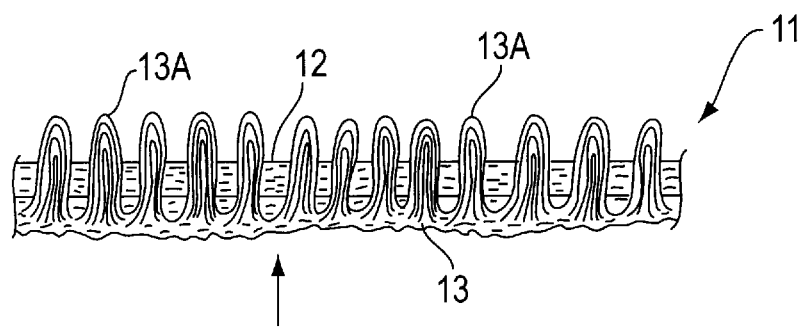
FIG. 10 is a partially sectional view of a conventional composite fiber sheet.

Furthermore FIG. 8 and FIG. 9 relate to another embodiment of the present invention. In this embodiment, another fiber sheet 8 is inserted between the the first fiber sheet 2 and the second fiber sheet 3. Another fiber sheet 8 is drawn out from the roll 9 through the roller 16 and laminated on the back-side of the first fiber sheet 2 needled by the first needling machine 13 and then needled by the second needling machine 15.

As shown in FIG. 9, the composite fiber sheet 31 is manufactured wherein another fiber sheet 8 is inserted between the first fiber sheet 2 and the second fiber sheet 3. As another fiber sheet 8, for example, fiber nonwoven fabric, knitted web or woven fabric, plastic film, elastomer film, synthetic rubber film, metal foil and the like may be used. Another fiber sheet 8 may reinforce the composite fiber sheet 31. When another fiber sheet 8 is a nonwoven fabric, knitted web or woven fabric consisting of thermoplastic fiber such as polyethylene fiber, polypropylene fiber, polyester fiber having a low melting point and the like, or consists of thermoplastic such as polyethylene, polypropylene, ethylene-propylene copolymer, ethylene-vinyl acetate copolymer, poly vinyl chloride, poly vinylidene chloride, polystyrene, poly vinyl acetate, fluoroplastic, thermoplastic acryl resin, thermoplastic polyester, thermoplastic polyamide, thermoplastic urethane resin, acrylonitrile-butadiene-styrene copolymer and the like, the composite fiber sheet 31 is given moldability in addition to the reinforcing effect. When another fiber sheet 8 is a tricot, spandex knitted web or woven fabric, or elastomer film consisting of styrene series thermoplastic elastomer such as styrene-butadiene-styrene copolymer, styrene-isoprene-styrene copolymer, styrene-hydrogenated polyolefin-styrene copolymer and the like or block copolymer such as butadiene-styrene block copolymer, styrene-elastomer intermediate block-styrene copolymer, synthetic rubber or natural rubber such as acrylic rubber, butyl rubber, silicon rubber, urethane rubber, fluoride series rubber, polysulfide rubber, graft rubber, butadiene rubber, isoprene rubber, chloroprene rubber, polyisobutylene rubber, polybutene rubber, isobutene-isoprene rubber, acrylate-butadiene rubber, styrene-butadiene rubber, acrylonitrile-butadiene rubber, pyridine-butadiene rubber, styrene-isoprene rubber, acrylonitrile-chloroprene rubber, styrene-chloroprene rubber and the like, the composite fiber sheet 31 is given act resilience in addition to the reinforcing effect and the composite fiber sheet 31 having an excellent feeling is obtained. When a metal foil is used as another fiber sheet 8, the composite fiber sheet 31 having heat shield properties is obtained.

If desirable, another fiber sheet 8 may be laminated on back-side of the second fiber sheet 3 after the second fiber sheet 3 is laminated on the back-side of the first fiber sheet 2.

In addition to the above embodiment, if desirable, both of the fiber sheets 2, 3 may be a web, or the first fiber sheet may be a web and the second fiber sheet may be a needle punched nonwoven fabric.

According to the present invention, composite fiber sheets having an excellent feeling, an attractive appearance and a variety of functionality can be easily manufactured.

What is claimed is:

1. A method of manufacturing a composite fiber sheet comprising:

forming a first pile layer on the upper surface of a first fiber sheet by a first needling from the back-side of the first fiber sheet;

joining a second fiber sheet on the back-side of the first fiber sheet to form a two layer fiber sheet; and forming a second pile layer on the upper surface of the first fiber sheet by a second needling from the back-side of the two layer fiber sheet and combining the first fiber sheet and second fiber sheet at the same time to form the composite sheet;

wherein the second pile layer is formed from the second fiber sheet.

2. A method according to claim 1 wherein the color of said first fiber sheet is different from the color of said second fiber sheet.

3. A method according to claim 1 wherein first piles of said first pile layer formed by said first needling are at locations that differ from those of second piles of said second pile layer formed by said second needling.

\* \* \* \* \*